(12) United States Patent
Binder

(10) Patent No.: US 11,586,961 B2
(45) Date of Patent: Feb. 21, 2023

(54) SYSTEM AND METHOD FOR IDENTIFYING A PREFERRED SENSOR

(71) Applicant: RAYTHEON COMPANY, Waltham, MA (US)

(72) Inventor: Michael Karl Binder, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 1225 days.

(21) Appl. No.: 16/104,097

(22) Filed: Aug. 16, 2018

(65) Prior Publication Data

US 2020/0057954 A1  Feb. 20, 2020

(51) Int. Cl.
*G06N 7/00* (2006.01)
*G06F 17/13* (2006.01)

(52) U.S. Cl.
CPC ............ *G06N 7/005* (2013.01); *G06F 17/13* (2013.01)

(58) Field of Classification Search
CPC ................................ G06N 7/005; G06F 17/13
See application file for complete search history.

(56) References Cited

U.S. PATENT DOCUMENTS

| | | | |
|---|---|---|---|
| 8,255,354 B2 | 8/2012 | Bell et al. | |
| 8,583,585 B2 | 11/2013 | Ghanadan et al. | |
| 8,706,676 B2 | 4/2014 | Claxton et al. | |
| 8,775,127 B2 | 7/2014 | Gomez et al. | |
| 2008/0243439 A1 | 10/2008 | Runkle et al. | |
| 2015/0228056 A1* | 8/2015 | Yaguchi | A61B 1/041 382/282 |
| 2016/0314097 A1* | 10/2016 | Bradford | G01D 1/16 |

OTHER PUBLICATIONS

Robust Multi-Bernoulli Sensor Selection for Multi-Target Tracking in Sensor Networks (Gostar) taken from https://ieeexplore.ieee.org/stamp/stamp.jsp?tp=&arnumber=6612706 (Year: 2013).*
A learning automata based scheduling solution to the dynamic point coverage problem in wireless sensor networks (Esnaashari) taken from http://citeseerx.ist.psu.edu/viewdoc/download?doi=10.1.1.420.7237&rep=rep1&type=pdf (Year: 2010).*
Review of Likelihood Theory (princeton) retrieved via internet archive on Aug. 30, 2017 from https://web.archive.org/web/20170830020520/https://data.princeton.edu/wws509/notes/a1.pdf(Year: 2017).*
Application of the squared mahalanobis distance for detecting outliers in multivariate non-Gaussian data (Prykhodko) taken from https://ieeexplore.ieee.org/document/8336353 (Year: 2018).*

(Continued)

*Primary Examiner* — Alexey Shmatov
*Assistant Examiner* — Robert Bejcek, II
(74) *Attorney, Agent, or Firm* — Lewis Roca Rothgerber Christie LLP

(57) ABSTRACT

A system and method for selecting one sensor from among a plurality of sensors. For each of the plurality of sensors, a conditional probability of the sensor correctly identifying the target from among a plurality of objects detected by the sensor, given an association event, is calculated, and multiplied by a reward function for the sensor. The sensor for which this product is greatest is selected.

14 Claims, 5 Drawing Sheets

(56) References Cited

OTHER PUBLICATIONS

Depth First Search or DFS for a Graph (GeeksforGeeks) taken from retrieved via Internet archive on Apr. 27, 2018 from https://web.archive.org/web/20180427111518/https://www.geeksforgeeks.org/depth-first-search-or-dfs-for-a-graph/ (Year: 218).*

An Algorithm for Ranking all the Assignments in Order of Increasing Cost (Murty) taken from https://pubsonline.informs.org/doi/pdf/10.1287/opre.16.3.682 (Year: 1968).*

Sensor Selection for Event Detection in Wireless Sensor Networks (Bajovic) taken from https://ieeexplore.ieee.org/document/5930376 (Year: 2011).*

Gostar, et al. "Robust Multi-Bernoulli Sensor Selection for Multi-Target Tracking in Sensor Networks", IEEE Signal Processing Letters, IEEE Service Center, vol. 20, No. 12, Dec. 1, 2013 (pp. 1167-1170).

Esnaashari, et al. "A Learning Automata Based Scheduling Solution to the Dynamic Point Coverage Problem in Wireless Sensor Networks", Computer Networks, Elsevier, Amsterdam, NL, vol. 54, No. 14, Oct. 6, 2010 (pp. 2410-2438).

Lima, et al. "A Decision-theoretic Approach to Dynamic Sensor Selection in Camera Networks", RoCKIn View project SocRob View Project, Jan. 31, 2009, retrieved from the Internet: URL:https://www.researchgate.net/profile/Pedro_Lima4/publication/220936035_A_Decision-Theoretic_Approach_to_Dynamic_Sensor_Selection_in_Camera_Networks/links/559d066b08ae5d5eae66f67c/A-Decision-Theoretic-Approach-to-Dynamic-Sensor-Selection-in-Camera-Networks.pdf [retrieved on Sep. 25, 2019].

International Search Report for corresponding International Application No. PCT/US2019/036747, filed Jun. 12, 2019, International Search Report dated Sep. 27, 2019 and dated Oct. 7, 2019 (5 pgs.).

Written Opinion of the International Searching Authority for corresponding International Application No. PCT/US2019/036747, filed Jun. 12, 2019, Written Opinion of the International Searching Authority dated Oct. 7, 2019 (7 pgs.).

Liang, P., Course notes for Lecture 7, CS221: Artificial Intelligence: Principles and Techniques, Stanford University, 2015.

Liang, P., Course notes for Lecture 8, CS221: Artificial Intelligence: Principles and Techniques, Stanford University, 2015.

Liang, P., Course notes for Lecture 13, CS221: Artificial Intelligence: Principles and Techniques, Stanford University, 2015.

Liang, P., Course notes for Lecture 14, CS221: Artificial Intelligence: Principles and Techniques, Stanford University, 2015.

Liang, P., Course notes for Lecture 15, CS221: Artificial Intelligence: Principles and Techniques, Stanford University, 2015.

* cited by examiner

SYSTEM AND METHOD FOR IDENTIFYING A PREFERRED SENSOR

GOVERNMENT LICENSE RIGHTS

This invention was made with U.S. Government support under contract No. N00024-15-C-5410 awarded by the US Navy. The U.S. Government has certain rights in this invention.

FIELD

One or more aspects of embodiments according to the present invention relate to sensing, and more particularly to a system and method for selecting a sensor from among a plurality of sensors.

BACKGROUND

In various commercial and military applications, sensor suites are used to detect a single target of interest, such as a drone with which a rendezvous is to be performed. The sensor suite may include a plurality of sensors having different characteristics, e.g., different resolving capabilities, and different noise levels. In such a system, the information generated by the sensors may be different, e.g., as a result of noise, or interference by targets other than the target of interest, and it may be advantageous to select one sensor from among the plurality of sensors.

Thus, there is a need for system and method for selecting one sensor from among a plurality of sensors.

SUMMARY

Aspects of embodiments of the present disclosure are directed toward a system and method for selecting one sensor from among a plurality of sensors. For each of the plurality of sensors, a conditional probability of the sensor correctly identifying the target from among a plurality of objects detected by the sensor, given an association event, is calculated, and multiplied by a reward function for the sensor. The sensor for which this product is greatest is selected.

According to an embodiment of the present disclosure there is provided a system for sensing a target, the system including: a plurality of sensors; and a processing circuit, the processing circuit being configured to: identify a preferred sensor from among the plurality of sensors, the identifying including: calculating, for each of the sensors, the product of: a reward function for the sensor; and a conditional probability of the sensor correctly identifying the target from among a plurality of objects detected by the sensor, given an association event, the association event including, for each of the plurality of sensors: a plurality of objects detected by the sensor, and an identification, by the sensor, of one of the plurality of objects as the target.

In some embodiments, the plurality of sensors consists of a first sensor and a second sensor, and the processing circuit is further configured to calculate the conditional probability of the first sensor correctly identifying the target from among a plurality of objects detected by the first sensor, given an association event, according to the proportionality relation $p(X_1=1|A) \propto p_1(p_2 p_A + (1-p_2)(1-p_A))$, wherein: $p_1$ is an estimated prior probability of the first sensor correctly identifying the target from among a plurality of objects detected by the first sensor, $p_2$ is an estimated prior probability of the second sensor correctly identifying the target from among a plurality of objects detected by the second sensor, and $p_A$ is an estimated probability of: the sensors both correctly identifying the target, or the sensors both incorrectly identifying the target.

In some embodiments, the processing circuit is further configured to calculate the estimated probability of: the sensors both correctly identifying the target, or the sensors both incorrectly identifying the target according to the equation $$p((i^*, j^*) \in \theta | \mathcal{D}) = \frac{\sum_{\{\theta : (i^*, j^*) \in \theta\}} L(\theta)}{\sum_{\theta \in \Theta} L(\theta)},$$

wherein: each $\theta$ is an association hypothesis between the plurality of objects detected by the first sensor and the plurality of objects detected by the second sensor, $\Theta$ is a set of all possible association hypotheses, and $L(\theta) = \exp \sum_{(i,j) \in \theta} l_{ij}$, wherein $l_{ij}$ is a log likelihood score corresponding to a measure of similarity between the i-th object detected by the first sensor and the j-th object detected by the second sensor.

In some embodiments, the processing circuit is further configured to calculate a log likelihood score $l_{ij}$ according to the equation $l_{ij} = \log p(z_i, w_j)$, wherein: $p(z_i, w_j) = (1 + d_{ij}^2) \exp(-d_{ij}^2) d_{ij}^2 = (z_i - w_j)^T \Sigma^{-1} (z_i - w_j) \Sigma = U_i + V_j$, $z_i$ is a vector of features of the i-th object detected by the first sensor, $w_j$ is a vector of features of the j-th object detected by the second sensor, $U_i$ is a covariance matrix of the first sensor, and $V_j$ is a covariance matrix of the second sensor.

In some embodiments, the processing circuit is further configured to substitute for the calculated log likelihood score $l_{ij}$ a value of negative infinity when the square root of $d_{ij}^2$ falls below a threshold.

In some embodiments, both the numerator and the denominator of the estimated probability of: the sensors both correctly identifying the target, or the sensors both incorrectly identifying the target are calculated using a depth-first search.

In some embodiments, both the numerator and the denominator of the estimated probability of: the sensors both correctly identifying the target, or the sensors both incorrectly identifying the target are calculated using a Murty algorithm.

According to an embodiment of the present disclosure there is provided a method for sensing a target with a plurality of sensors, the method including: identifying a preferred sensor from among the plurality of sensors, the identifying including: calculating, for each of the sensors, the product of: a reward function for the sensor; and a conditional probability of the sensor correctly identifying the target from among a plurality of objects detected by the sensor, given an association event, the association event including, for each of the plurality of sensors: a plurality of objects detected by the sensor, and an identification, by the sensor, of one of the plurality of objects as the target.

In some embodiments, the plurality of sensors consists of a first sensor and a second sensor, and the method further includes calculating the conditional probability of the first sensor correctly identifying the target from among a plurality of objects detected by the first sensor, given an association event, according to the proportionality relation $p(X_1=1|A) \propto p_1(p_2 p_A + (1-p_2)(1-p_A))$, wherein: $p_1$ is an estimated prior probability of the first sensor correctly identifying the target from among a plurality of objects detected by the first sensor, $p_2$ is an estimated prior probability of the second sensor correctly identifying the target from among a plurality of objects detected by the second sensor, and $p_A$ is an estimated probability of: the sensors both correctly identifying the target, or the sensors both incorrectly identifying the target.

In some embodiments, the method further includes calculating the estimated probability of: the sensors both correctly identifying the target, or the sensors both incorrectly identifying the target according to the equation $$p((i^*, j^*) \in \theta \mid \mathcal{D}) = \frac{\sum_{\{\theta : (i^*, j^*) \in \theta\}} L(\theta)}{\sum_{\theta \in \Theta} L(\theta)},$$

wherein: each $\theta$ is an association hypothesis between the plurality of objects detected by the first sensor and the plurality of objects detected by the second sensor, $\Theta$ is the set of all possible association hypotheses, and $L(\theta) = \exp \Sigma_{(i,j) \in \theta} l_{ij}$, wherein $l_{ij}$ is a log likelihood score corresponding to a measure of similarity between the i-th object detected by the first sensor and the j-th object detected by the second sensor.

In some embodiments, the method further includes calculating a log likelihood score $l_{ij}$ according to the equation $l_{ij} = \log p(z_i, w_j)$, wherein: $p(z_i, w_j) = (1 + d_{ij}^2) \exp(-d_{ij}^2) d_{ij}^2 = (z_i - w_j)^T \Sigma^{-1} (z_i - w_j) \Sigma = U_i + V_j$, $z_i$ is a vector of features of the i-th object detected by the first sensor, $w_j$ is a vector of features of the j-th object detected by the second sensor, $U_i$ is a covariance matrix of the first sensor, and $V_j$ is a covariance matrix of the second sensor.

In some embodiments, the method further includes substituting for the calculated log likelihood score $l_{ij}$ a value of negative infinity when the square root of $d_{ij}^2$ falls below a threshold.

In some embodiments, both the numerator and the denominator of the estimated probability of: the sensors both correctly identifying the target, or the sensors both incorrectly identifying the target are calculated using a depth-first search.

In some embodiments, both the numerator and the denominator of the estimated probability of: the sensors both correctly identifying the target, or the sensors both incorrectly identifying the target are calculated using a Murty algorithm.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for sensor coordination provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
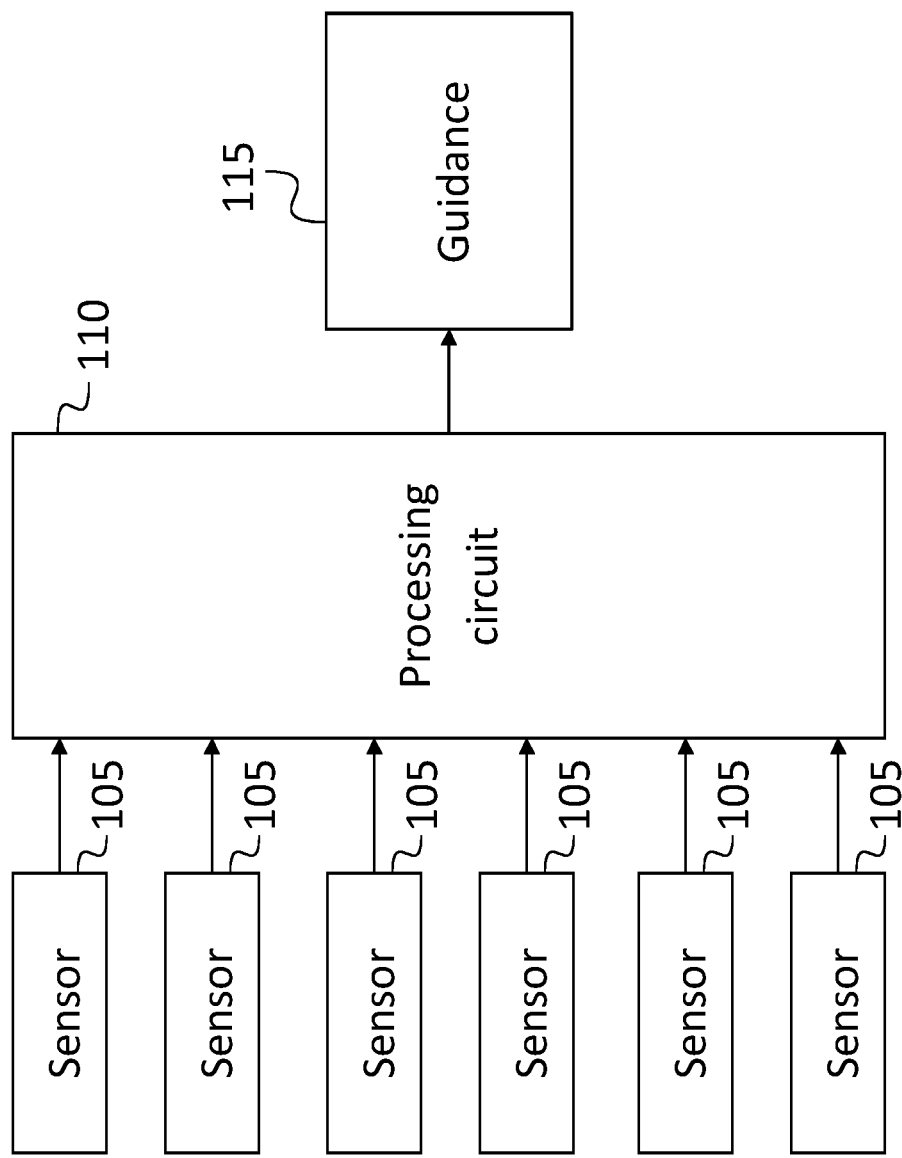
FIG. 1 is a block diagram of a sensing and guidance system, according to an embodiment of the present invention.

Referring to FIG. 1, in some embodiments, each sensor of a plurality of sensors 105 repeatedly makes measurements during a sequence of measurement intervals, and, at the end of each measurement interval, sends to a processing circuit 110 a set of objects, as well as an identifier of an object that is deemed, by the sensor, to represent a target of interest, i.e., an object of particular interest. The processing circuit 110 performs calculations based on the received sets of objects and data about the sensors, and identifies, within each measurement interval, which sensor 105 is preferred, e.g., most trustworthy. The processing circuit 110 may then forward the data from the preferred sensor 105 or the data for the target of interest identified by the preferred sensor 105 to another system, e.g., a guidance system 115, which may use the data, for example, to intercept the target of interest.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

Some embodiments of a system and method for sensor coordination may be used in military applications, e.g., to guide a missile to a target within a cluttered field of view, or in a variety of commercial applications, including unmanned systems in commercial use (autonomous vehicles, unmanned aerial vehicles (UAVs), etc.), guidance of UAVs and drones, coordination of autonomous vehicles, and sensor fusion and tracking based on multi-agent consensus.

For example, a missile may include two sensors, an infrared (IR) sensor and a radio frequency (RF) sensor. Each of the sensors may, during each measurement interval, detect a number of "objects" (i.e., signals that appear to correspond to physical objects within the field of view), some of which may be noise, some of which may be targets that are not of interest (e.g., "friendlies", or other real targets that are not the target of interest (e.g., enemy targets that are not the target of interest)) and one of which may be the target of interest. Each sensor may generate, for each of the objects, a vector of attributes, or "feature vector", which may for example be two angles and two angular rates (e.g., an azimuth angle, an elevation angle, an azimuth rate, and an elevation rate) corresponding to the apparent angular position and angular rates of the object with respect to the sensor. Each sensor may generate a covariance matrix, which is a square matrix with each dimension being the same size as the length of the feature vector. As mentioned above, each sensor may also generate, for each measurement interval, an identifier of an object that is deemed, by the sensor, to represent the target of interest. The two sensors may have different characteristics; for example, the IR sensor may have higher "quality", i.e., accuracy in measuring angles and angular rates, than the RF sensor, but it may have inferior reliability in correctly identifying the object that corresponds to the target of interest. In some embodiments input from an "agent" may be used in place of input from one or more of the sensors. An "agent" may be an entity which may communicate information to the system running the algorithm (e.g. the missile), so something like an off-board sensor. Examples in the missile application would be a ship or aircraft or other missile with an uplink capability to the missile running the algorithm. As such, as used herein, the term "sensor" may also refer to an external agent or off-board sensor in communication with the system.

Figure 2:
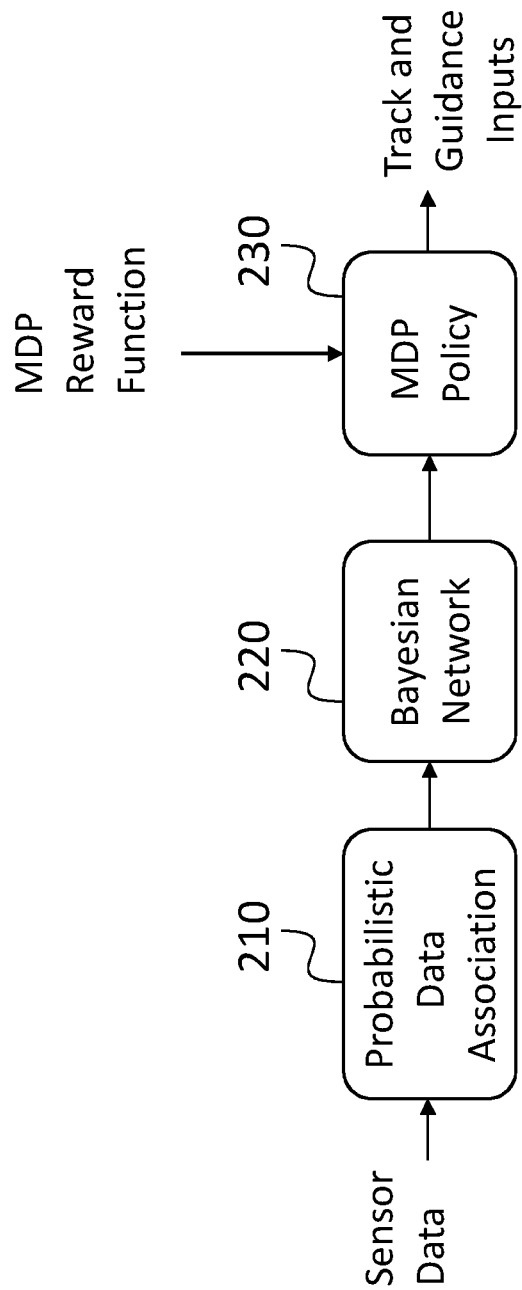
FIG. 2 is a schematic information flow diagram of a system and method for selecting a sensor, according to an embodiment of the present invention.

FIG. 2 is a schematic information flow diagram, according to one embodiment. In a probabilistic data association module 210 (which may be a software module executed by the processing circuit 110), the processing circuit 110 receives data from each of the sensors 105, and calculates a plurality of sensor-to-sensor association probabilities (which form the output of the probabilistic data association module 210), as discussed in further detail below. A Bayesian network module 220 receives the sensor-to-sensor association probabilities and forms a conditional probability model for the data association, using the received sensor-to-sensor association probabilities and prior belief models of the sensors. In some embodiments, the conditional probability model is a model of risk for trusting the data of any individual sensor in the network, e.g., it yields a probability that selecting the individual sensor's identified target of interest is correct. The output of the Bayesian network module 220 is the Markov decision process (MDP) transition probability model.

A Markov decision process module 230 then uses the conditional probability model, together with reward/utility models for the individual sensors, to make a decision regarding the trustworthiness of an individual sensor, as discussed in further detail below. In a missile guidance system, for example, this may mean choosing the sensor that provides the best combination of risk and reward for track and guidance input.

The probabilistic data association module may operate as follows. In some embodiments, the sensor coordination algorithm relies on the existence of common features measured by the sensors for comparison. For RF to IR sensor comparison in the context of missile guidance, these features may be line-of-sight angles and rates, as mentioned above. Each feature vector may have k (e.g., 4) elements. In some embodiments, the features are assumed to be normally distributed (e.g., jointly normally distributed) in the feature space. This assumption may be relaxed if the use of another distribution is advantageous. The advantages of different distribution assumptions may be data/implementation dependent. The distributions of the features may in certain implementations be compensated for sensor motions or other physical phenomena by secondary algorithms before processing.

The following notation may be used in the description of this method: Z is the set of objects seen by sensor $S_1$, and W is the set of objects seen by sensor $S_2$; for each object $i \in Z$ and object $j \in W$, feature vectors $z_i$ and $w_j$, with covariance $U_i$ and $V_j$, respectively, are obtained from the respective sensors. A log-likelihood score may then be calculated as follows:

$$l_{ij} = \log p(z_i, w_j)$$

$$p(z_i, w_j) = (1 + d_{ij}^2)\exp(-d_{ij}^2)$$

$$d_{ij}^2 = (z_i - w_j)^T \Sigma^{-1} (z_i - w_j)$$

$$\Sigma = U_i + V_j$$

where the expression for $p(z_i, w_j)$ is a chi-square distribution. The log-likelihood score $l_{ij}$ calculated in this manner may describe the (statistical) similarity between the two objects based on the features. These scores may be formed into an assignment matrix $\mathcal{A} = (l_{ij})$. "Gating" may be used on this matrix, e.g., a value of $l_{ij} = -\infty$ may be substituted for any element of the assignment matrix for which the Mahalanobis distance $d_{ij} = \sqrt{(z_i - w_j)^T \Sigma^{-1} (z_i - w_j)}$ exceeds a threshold. The assignment matrix $\mathcal{A}$ encodes all possible association hypotheses $\theta: Z \to W$, i.e. one-to-one (injective) mappings between the sets Z and W. The set of all possible association hypotheses may be referred to as $\Theta$.

If the candidate objects mapped to the target of interest (by the sensors, using identification/classification algorithms executing in the sensors) are referred to as $i^* \in Z$ and $j^* \in W$, then a probability score for the association of $i^*$ to $j^*$ may be derived by noting that $$p((i^*, j^*) \in \theta \mid \mathcal{D}) = \frac{\sum_{\{\theta : (i^*, j^*) \in \theta\}} L(\theta)}{\sum_{\theta \in \Theta} L(\theta)}$$

where $$L(\theta) = \exp \sum_{(i,j) \in \theta} l_{ij}$$

and where the $l_{ij}$ are the log-likelihood scores stored in the assignment matrix $\mathcal{A}$, and $\mathcal{D} = (Z, W)$ is the data. Both the numerator and the denominator of the association probability $p_A \triangleq p((i^*, j^*) \in \theta \mid \mathcal{D})$ may be calculated using a depth-first search (traversal) of the hypothesis tree encoded by the matrix $\mathcal{A}$. Accordingly, the use of gating in the generation of $\mathcal{A}$ (as mentioned above) may be used to control the sparsity of the tree and the number of computations required to calculate $p_A$. If each sensor detects a sufficiently large number of objects that an exhaustive search (e.g., a depth-first search) is burdensome, the Murty algorithm may be used to approximate the sums, instead of performing an exhaustive (e.g., depth-first) search. Such an algorithm is described in the following publication, which is hereby incorporated herein by reference in its entirety: Katta G. Murty, (1968) *Letter to the Editor—An Algorithm for Ranking all the Assignments in Order of Increasing Cost*. Operations Research 16(3):682-687.

Figure 3:
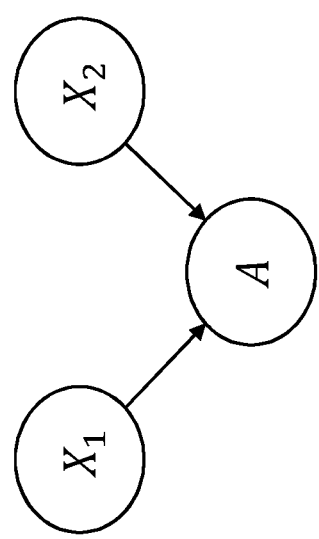
FIG. 3 is a Bayesian network for two sensors, according to an embodiment of the present invention.
Figure 4A:
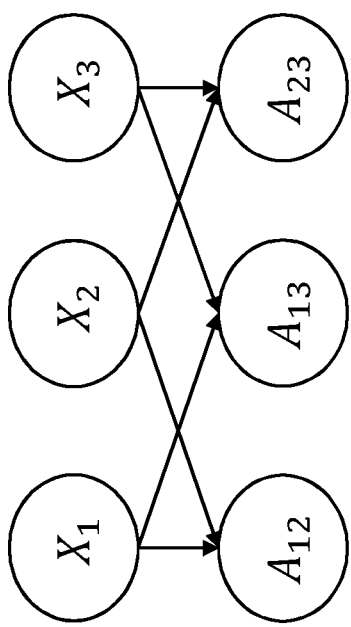
FIG. 4A is a Bayesian network for three sensors, according to an embodiment of the present invention.
Figure 4B:
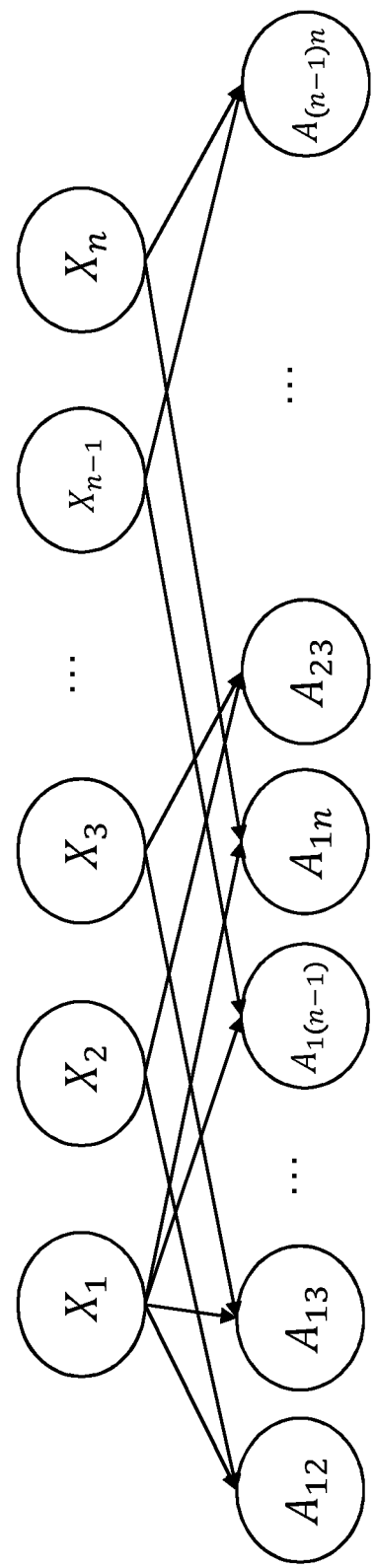
FIG. 4B is a Bayesian network for a arbitrary number of sensors, according to an embodiment of the present invention.
Figure 5:
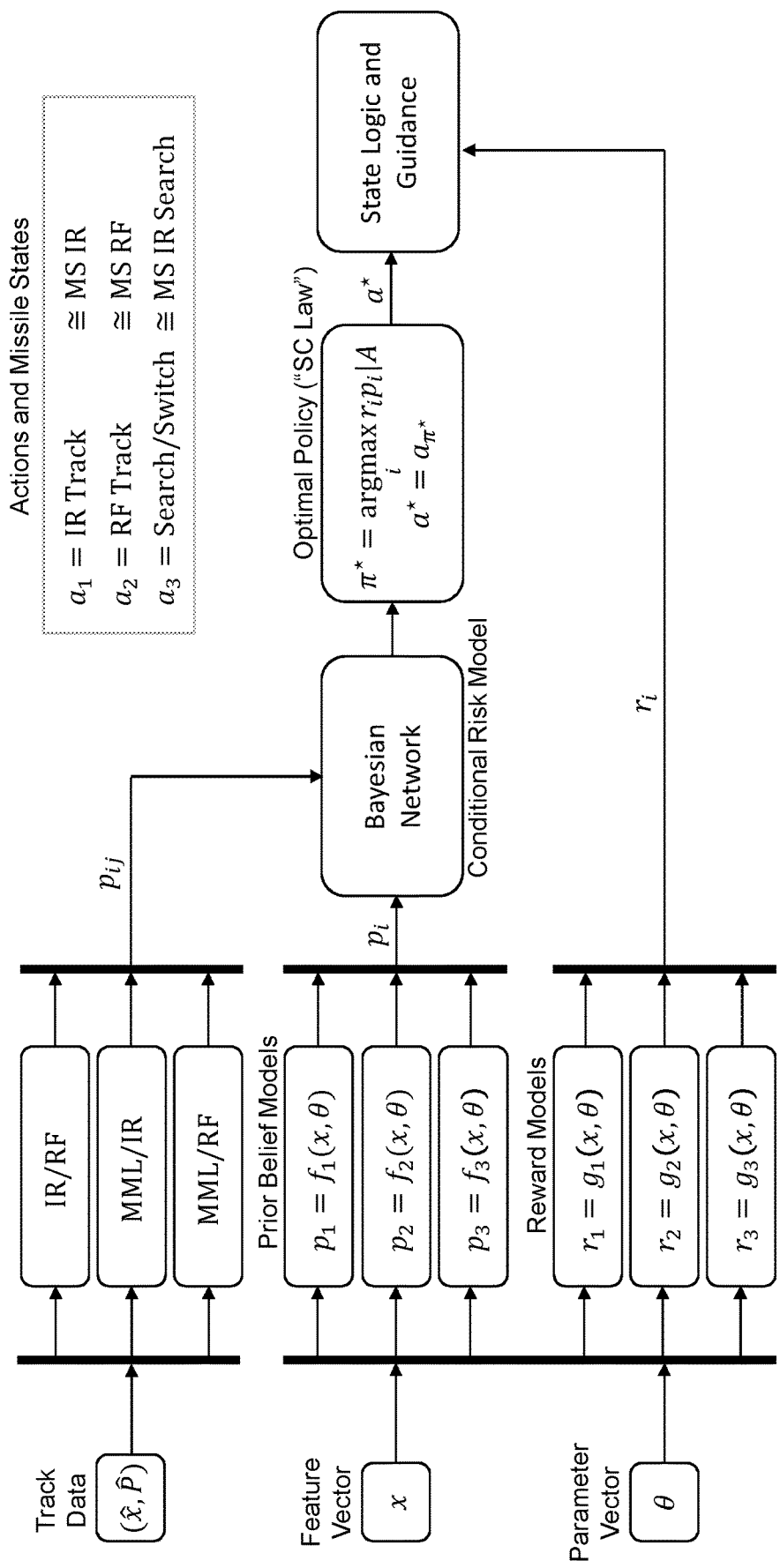
FIG. 5 is a block diagram representation of a sensor coordination algorithm in a three-sensor system, according to an embodiment of the present invention.

In the Bayesian network module 220, a conditional probability may be calculated for each sensor, the conditional probability being the probability of the sensor correctly identifying the target of interest from among a plurality of objects detected by the sensor, given an association event. Referring to FIG. 3, in the Bayesian network shown, A may represent the data association event, and $X_1$, $X_2$ may be binary-valued random variables where $X_i=1$ indicates a correct identification of the target of interest by sensor $S_i$. The Bayesian network of FIG. 3 encodes the conditional relationship of the data association process on the sensors. This network architecture may be generalized, as shown in FIG. 4A and in FIG. 5 (for three sensors) or FIG. 4B (for n sensors). In FIG. 5, "MML" is an abbreviation for "Missile-to-missile Datalink". The prior probabilities $p_i=p(X_i=1)$ for each sensor may be known, from testing of the sensors, as described in further detail below. Using the rules $p(A=1|X_i=1,X_j=1)=p_A$ and $p(A=1|X_i,X_j\neq X_i)=1-p_A$ and $p(A=1|X_i=0,X_j=0)=qp_A+(1-q)(1-p_A)$, and exact inference on the network, the following conditional probability formulas may be obtained:

$$p(X_1=1|A) \propto (p_1(p_2 p_A+(1-p_2)(1-p_A))$$

$$p(X_1=0|A) \propto (1-p_1)(p_2(1-p_A)+(1-p_2)(qp_A+(1-q)(1-p_A)))$$

$$p(X_2=1|A) \propto p_2(p_1 p_A+(1-p_1)(1-p_A))$$

$$p(X_2=0|A) \propto (1-p_2)(p_1(1-p_A)+(1-p_1)(qp_A+(1-q)(1-p_A)))$$

The following intuition may apply to the network. Consider the network of FIG. 3. The random variable ("r.v.") A is defined as depending conditionally on the two binary r.v.'s $X_1$ and $X_2$ associated to the sensors. In the framework of Bayesian networks, this means that the distribution $p(A|X_1, X_2)$ is described by a probability table. For the sensor coordination algorithm, this table is defined as follows:

| $X_1$ | $X_2$ | $p(A = 1|X_1, X_2)$ | Comments |
|---|---|---|---|
| 1 | 1 | $p_A$ | Both sensors choose the desired object. |
| 1 | 0 | $1 - p_A$ | 1 chooses correctly, 2 does not. |
| 0 | 1 | $1 - p_A$ | 2 chooses correctly, 1 does not. |
| 0 | 0 | $qp_A + (1 - q)(1 - p_A)$ | Neither sensor chooses the desired object. |

The following intuition may apply to the r.v. A and choices of conditional probabilities $p(A|X_1, X_2)$.

The r.v. A represents an association event between sensors and its distribution $p(A|X_1, X_2)$ describes the "consistency" of the association in the strict logical sense, and with respect to the statistical similarity of the objects being compared (through the probability measure $p_A$).

Case $X_1=1$, $X_2=1$: It is assumed implicitly that both sensors have chosen the desired object, thus the consistency of the association is directly related to the statistical similarity, as described by $p_A$. (I.e., higher consistency when objects are similar.)

Cases $X_1=1$, $X_2=0$ or $X_1=0$, $X_2=1$: It is assumed implicitly that both sensors have chosen different objects, therefore the consistency of the association is rather related to how statistically dissimilar the objects are, i.e., $1-p_A$. (I.e., higher consistency when objects are dissimilar.)

Case $X_1=0$, $X_2=0$: It is implied that neither sensor has chosen the target correctly, but it is unknown as to whether the sensors otherwise chose the same or different objects. The parameter $q \in [0,1]$ is a probability that the sensors choose the same object, hence consistency of the association in this case is intermediate between the two above cases. Intuitively q may be modeled using the expected object densities of both sensor fields-of-view, however it induces only a minor higher-order effect in the overall algorithm, dominated by prior distributions, so may be assumed to be a constant.

In the case of n sensors, the rules $p(A_{ij}=1|X_i=1,X_j=1)=p_{ij}$ and $p(A_{ij}=1|X_i,X_j\neq X_j)=1-p_{ij}$ and $p(A_{ij}=1|X_i=0,X_j=0)=qp_{ij}+(1-q)(1-p_{ij})$ may be used, where $p_{ij}$ is the association probability corresponding to the pair $(S_i, S_j)$, to derive the conditional probabilities $p|A$, where $A=U_{i,j}A_{ij}$.

A network for coordinating three sensors or agents with association between all three pairings, where for example one could have $S_1$=IR, $S_2$=RF and $S_3$=MML (missile-to-missile link treated as a sensor) is shown in FIG. 4A. As mentioned above, using the rules $p(A_{ij}=1|X_i=1,X_j=1)=p_{ij}$ and $p(A_{ij}=1|X_i,X_j\neq X_j)=1-p_{ij}$ and $p(A_{ij}=1|X_i=0,X_j=0)=qp_{ij}+(1-q)(1-p_{ij})$, where $p_{ij}$ is the association probability corresponding to the pair $(S_i, S_j)$, and an exact inference method (e.g. variable elimination), the conditional probabilities $p|A$, where $A=U_{ij} A_{ij}$, may be derived.

This network is thus parameterized by (up to) three correlation algorithms to generate the association probabilities $p_{ij}$, and three prior distributions $p_i$ corresponding to the $X_i$. For example:

$A_{12}$=IR/RF Correlation,
$A_{13}$=MML/IR Correlation, and
$A_{23}$=MML/RF Correlation Example features for RF-sensor prior distribution include measured/assumed emitter indicators, frequency agility indicators, measure of overlap in frequency of threats, measure of overlap in angle space of threats, or the like. Any emitter message indicators may potentially be used. For cases with no IR, and/or no RF and/or no MML data available, a reduced model is attained by simply removing the corresponding nodes from the network. This effectively reduces the system to the two-sensor model when appropriate.

The Markov decision process policy applied in the Markov decision process module 230 may be derived as the solution to a Markov decision process (MDP). The specific mathematical parameters of the Markov decision process may have the following form. The state space S has the form $S=\{0,1\}$, where 1 indicates a correct decision. The action space A has the form $A=\{S_1, S_2, \ldots, S_n\} \cong \{1, 2, \ldots, n\}$ where n is the number of sensors. The reward function R describes the quality of the sensor data and has the form $$R(s, a) = \begin{cases} r_a & \text{if } s = 1 \\ 0 & \text{otherwise} \end{cases}.$$

The transition probability model describes the risk inherent in trusting the sensor data and has the form $$T(s, a, s') = \begin{cases} p_a | A & \text{if } s' = 1 \\ 1 - p_a | A & \text{otherwise} \end{cases}$$

where the probabilities $p|A$ are conditioned on a (probabilistic) data association process. The conditional probabilities are modeled via inference on a Bayesian network. The optimal policy $\pi^*$ of this Markov decision process described earlier may then be related to the solution of the following parametric linear program (LP):

$$\text{maximize} \sum_i (r_i p_i \mid A) u_i$$

$$\text{subject to } \sum_i u_i = \frac{1}{1-\gamma},$$

with $\gamma \in (0, 1)$ and $u \geq 0$.

Referring to the solution to this linear program by $u^*$, the optimal policy may be written $\pi^* = \arg\max_i u_i^*$.

The above parametric linear program may be solved by inspection. The solution $u^*$ is dependent on the reward function R and the conditional probabilities p|A. The optimal policy as a function of these parameters has the form $$\pi^*(r, p \mid A) = \arg\max_i r_i p_i \mid A.$$

Accordingly, the sensor for which the product of $r_i$ and $p_i|A$ is greatest is the one that is the sensor of choice, according to the Markov decision process described here. As the solution to a Markov decision process, the sensor coordination policy maximizes the expected utility accrued over flight per the given risk-reward characterization of the sensors.

The prior distributions $p(X_i=1)$ for a sensor may be estimated as follows. A series of experiments may be performed in each of which the true classifications/identities of the objects being sensed are known; these may be compared against how the sensor classifies/identifies the objects, particularly the target of interest.

The prior probability $p(X_i=1)$ is then approximately equal to:

$$\frac{\text{\# of correct target identifications by } X_i}{\text{\# of trials}}.$$

The argmax rule above ($\pi^*$ (r,p|A)=arg max$_i$ $r_i p_i$|A) may be related to the Q-function from reinforcement learning via $$\pi^* = \arg\max_\alpha r_\alpha p_\alpha | A = \arg\max_\alpha Q^*(\alpha),$$

i.e. it may be said that $(Q^*(a) = r_\alpha p_\alpha|$. Furthermore, if $p_\alpha|A = F_\alpha(u, \{p_\alpha(x, \theta)\}_{\alpha \in A})$ is taken to represent the functional form of the Bayesian network with exogenous input vector $u = (p_{ij})_{i,j}$, then the following may hold: $Q(\alpha;u,x,\theta) = r_\alpha(x,\theta)F_\alpha(u,\{p_\alpha(x,\theta)\}_{\alpha \in A})$, such that the Q-function is parameterized by the inputs u and x and parameter vector $\theta$.

The principles of reinforcement learning (Q-Learning) may be applied to parametrically optimize the sensor coordination policy with respect to performance. This may be accomplished as follows.

First, a terminal state reward R $(s_{t_f}) = f(\text{Miss})$ may be defined when $s_{t_f} = 1$ (correct target decision at final time $t_f$) with $f$ a decreasing function of miss distance. It may be noted that a true miss or intercept with an undesired target means a reward of zero.

Second, an initial parameter estimate $\theta_0$ may be fixed.

Finally the following two steps may be repeated until convergence $\theta_i \to \theta^*$:

In a first step, a batch set of runs with current parameter estimate $\theta_i$ may be run, and the batch set may be post-processed into a sequence of states and actions with observed rewards and exogenous inputs $(\alpha_j, s_j, r_j, u_j, x_j)_{j=1}^N$.

In a second step, a Q-Learning parameter update for $\theta_{i+1}$ may be done, by minimizing a given loss function (e.g., sum of squared errors over the data set). For example, a stochastic gradient descent (SDG) may be used.

Convergence of Q-Learning may depend on the expressiveness of the parametric features used. Experimentation with different features may be necessary to yield a convergent solution $Q^* = Q(\alpha; u, x, \theta^*)$.

Optimization via reinforcement learning may proceed as follows. The following Q-Learning SGD update equation may be used:

$$\theta_{i+1} = \theta_i - \alpha(r_j + \gamma \max_\alpha Q(\alpha;u_j,x_j,\theta_{i-1}) - Q(\alpha_j;u_j,x_j,\theta_i))\nabla_\theta Q (\alpha_j;u_j,x_j,\theta_i),$$

where $\alpha > 0$ is a step size ("learning rate") and $$\nabla_\theta Q = \nabla_\theta \left( r_{a_j} F_{a_j}(u_j, \{p_a\}_{a \in A}) \right)$$
$$= \nabla_\theta r_{a_j} F_{a_j}(u_j, \{p_a\}_{a \in A}) + r_{a_j} \nabla_\theta F_{a_j}(u_j, \{p_a\}_{a \in A})$$
$$= \nabla_\theta r_{a_j} F_{a_j}(u_j, \{p_a\}_{a \in A}) + r_{a_j} \sum_{a \in A} \left( \frac{\partial F_{a_j}}{\partial p_a} \bigg|_{u=u_j, \theta=\theta_i} \nabla_\theta p_a \right)$$

Detailed Derivation

The following paragraphs include a more detailed derivation of the results referred to above.

Multi-Sensor Data Association

Let $G = (V, E)$ be a graph with $V = \{S_i\}_{i=1}^n$ and $E = \{(S_i, S_j): S_i, S_j \text{ measure common features}\}$, which will be referred to as the sensor graph. The simplified notation (i,j) may be used to represent an edge $(S_i, S_j) \in E$ for notational convenience.

Sensor Coordination

Let $S_1, S_2, \ldots, S_n$ be a set of sensors. Corresponding binary-valued random variables $X_1, X_2, \ldots, X_n$ are defined, where $X_i = 1$ indicates a correct identification by sensor $S_i$. Let $p(X_i)$ for $i = 1, 2, \ldots, n$ be prior distributions for these sensors, i.e. they represent the probability of correct object identification. Let $$A = \bigcup_{(i,j) \in E} A_{ij}$$

represent the multi-sensor data association, where $A_{ij}$ for $(i,j) \in E$ is a random variable representing the data association between two data of interest on edge (i,j) of the sensor graph. From the data association, a set of probabilities $p_{ij}$ for $(i,j) \in E$ may be obtained, which represent the probability of association between two data of interest in sensors $S_i$ and $S_j$. The sensor coordination problem may be posed as the problem of choosing a sensor $S^*$ which maximizes the probability of correct identification given the data, and given the sensor network G, the prior distributions $p(X_j)$ and the association probabilities $p_{ij}$. In the following section, this problem is modeled as a Markov Decision Process (MDP) and an optimal policy is derived.

MDP Formulation

Let $S \approx \{0, 1\}$ be the state space of the MDP, where the states represent incorrect and correct object identification, respectively. The action space $\mathcal{A} \approx \{1, 2, \ldots, n\}$ represents choices from among the n sensors in the network. The transition probabilities T (s, a, s') may be defined as follows:

$$T(s, a, s') = \begin{cases} p_{i|A} & \text{if } a = i \text{ and } s' = 1 \\ 1 - p_{i|A} & \text{if } a = i \text{ and } s' = 0 \end{cases}$$

where
$p_{i|A} = p(X_i = 1 | A)$
is the probability of a correct identification conditioned on the data association A. The reward function is defined as $$R(s, a) = \begin{cases} r_i & \text{if } a = i \text{ and } s = 1 \\ 0 & \text{otherwise} \end{cases}$$

where $r_i$ for $i = 1, 2, \ldots, n$ are given constants. With these definitions, the MDP is parameterized by the data association event A via the probabilistic conditioning.

Conditional Probability Modeling

In this section, formulas for the computation of the conditional probabilities $p(X_i = 1 | A)$, i.e., the probability of the i-th sensor making a correct identification given the multi-sensor data association A, are derived. To model this distribution, a Bayesian network is designed as follows. Suppose that the network includes nodes corresponding to each of the random variables $X_i$ for $i = 1, 2, \ldots, n$ and the random variables $A_{ij}$ for $(i,j) \in E$. The network is then defined by the relations $pa(X_i) = \emptyset$
$pa(A_{ij}) = \{X_i, X_j\}$ for each $(i,j) \in E$. That is to say, the nodes of the random variables $A_{ij}$ corresponding to the data association are children of the nodes corresponding to the sensors $X_i$. The network thus defined is sufficient to describe the joint distribution $p(X_i, A_{ij} | i=1,2, n, (i,j) \in E)$.

In this manner, probabilities $p_{ij}$ relating the association of data on edge $(i,j) \in E$ are derived from the multisensor data association. Using these probability measures, conditional probabilities $p(X_i = 1 | A)$ may be derived via inference on the network, using the following rules:

$p(A_{ij} | X_i = X_j) = p_{ij}$ $p(A_{ij} | X_i \neq X_j) = 1 - p_{ij}$.

That is, the probability of the association given that the sensors are either both correct or both in error is equal to the association probability $p_{ij}$, and the probability of the association given that one of the sensors is correct and the other is in error is equal to $1 - p_{ij}$. In the general case of n sensors and an arbitrary sensor graph G, closed form solutions for the conditional probabilities $p(X_i = 1 | A)$ are cumbersome, but inference is nevertheless solvable via algorithms such as variable elimination. The following subsections discuss one special case.

Conditional Probability Model for n=2

Consider two sensors $S_1, S_2$ and one association $A = A_{12}$. Then $$p(X_1 = x_1 | A) \propto \sum_{x_2} p(X_1 = x_1, X_2 = x_2, A_{12}) =$$

$$\sum_{x_2} p(X_1 = x_1) p(X_2 = x_2) p(A_{12} | X_1 = x_1, X_2 = x_2) =$$

$$p(X_1 = x_1) \sum_{x_2} p(X_2 = x_2) p(A_{12} | X_1 = x_1, X_2 = x_2).$$

This begets the equations $$p(X_1 = 1 | A) \propto p(X_1 = 1)(p(X_2 = 1)p(A_{12} | X_1 = 1, X_2 = 1) +$$
$$p(X_2 = 0)p(A_{12} | X_1 = 1, X_2 = 0)) =$$
$$p_1(p_2 p_{12} + (1 - p_2)(1 - p_{12})) = p_1(1 - p_2 - p_{12} + 2p_2 p_{12})$$
$$p(X_1 = 0 | A) \propto p(X_1 = 0)(p(X_2 = 1)p(A_{12} | X_1 = 0, X_2 = 1) +$$
$$p(X_2 = 0)p(A_{12} | X_1 = 0, X_2 = 0)) =$$
$$(1 - p_1)(p_2(1 - p_{12}) + (1 - p_2)p_{12}) = (1 - p_1)(p_2 + p_{12} - 2p_2 p_{12})$$

Let $\beta_1 = p_2 + p_{12} - 2p_2 p_{12}$, then let $$\alpha_1 = \sum_{x_1} p(X_1 = x_1 | A) = p(X_1 = 0 | A) + p(X_1 = 1 | A) =$$

$$p_1(1 - \beta_1) + (1 - p_1)\beta_1 = p_1 + \beta_1 - 2p_1 \beta_1.$$

Thus, $$p(X_1 = 1 | A) = \frac{p_1(1 - \beta_1)}{\alpha_1}$$

$$p(X_1 = 0 | A) = \frac{(1 - p_1)\beta_1}{\alpha_1}$$

and analogously, $$p(X_2 = 1 | A) = \frac{p_2(1 - \beta_2)}{\alpha_2}$$

$$p(X_2 = 0 | A) = \frac{(1 - p_2)\beta_2}{\alpha_2}$$

where $\beta_2 = p_1 + p_{12} - 2p_1 p_{12}$ and $\alpha_2 = p_2 + \beta_2 - 2p_2 \beta_2$.

Optimal Sensor Coordination Policy

For MDPs with finite state and action spaces, the optimal policy $\pi^*$ may be derived via solution of the following dual linear program:

$$\underset{\lambda}{\text{maximize}} \sum_{s \in S} \sum_{a \in A} \sum_{s' \in S} \lambda_{sa} T(s, a, s') R(s, a)$$

subject to $$\sum_{a \in A} \lambda_{s'a} = \mu_{s'} + \gamma \sum_{s \in S} \sum_{a \in A} \lambda_{sa} T(s, a, s'), \forall s' \in Ss$$

$$\lambda_{sa} \geq 0, \forall s \in S, \forall a \in \mathcal{A}$$

where $\gamma \in (0,1)$ is the discount factor and $\Sigma_s \mu_s = 1$ with $\mu_s \geq 0$ for all $s \in S$ is a given probability distribution over the states. The Lagrange multipliers $\lambda_{sa}$, give the optimal policy via $\pi^*(s) = \arg \max \lambda_{sa}$.

An analytical solution for the sensor coordination MDP may then be derived as follows. Let $u_i = \Sigma_{s \in S} \lambda_{si}$. It can be shown that the LP above may be written as $$\underset{\lambda}{\text{maximize}} \sum_i r_i p_{i|A} u_i$$

subject to $$\sum_i u_i = \frac{1}{1-\gamma}$$

$$u_i \geq 0, \forall i.$$

Let $i^* = \arg\max_i r_i p_{i|A}$. By inspection, it may be seen that the objective is maximized if and only if $$u_{i^*} = \frac{1}{1-\gamma}$$

and $\mu_i = 0$ if $i \neq i^*$. This results in the equations $$\lambda_{1i^*} = \mu_1 + \gamma p_{i^*|A}(\lambda_{i1^*} + \lambda_{2i^*})$$

$$\lambda_{2i^*} = \mu_2 + \gamma(1 - p_{i^*|A})(\lambda_{1i^*} + \lambda_{2i^*})$$

which can be rewritten as the matrix equation $$\begin{bmatrix} 1 - \gamma p_{i^*|A} & -\gamma p_{i^*|A} \\ -\gamma(1 - p_{i^*|A}) & 1 - \gamma(1 - p_{i^*|A}) \end{bmatrix} \begin{bmatrix} \lambda_{1i^*} \\ \lambda_{2i^*} \end{bmatrix} = \begin{bmatrix} \mu_1 \\ \mu_2 \end{bmatrix}.$$

This system yields the solution $$\lambda_{1i^*} = \frac{\mu_1 - \gamma\mu_1 + \gamma p_{i^*|A}\mu_1 + \gamma p_{i^*|A}\mu_2}{1-\gamma}$$

$$\lambda_{2i^*} = \frac{\mu_2 + \gamma\mu_1 - \gamma p_{i^*|A}\mu_1 - \gamma p_{i^*|A}\mu_2}{1-\gamma}$$

which satisfies $\lambda_{1i^*}, \lambda_{2i^*} > 0$ and $$\lambda_{1i^*} + \lambda_{2i^*} = \frac{1}{1-\gamma}$$

for any choice of $\mu_1$, $\mu_2$ such that $\mu_1 + \mu_2 = 1$, and any $0 \leq p_{i^*|A} \leq 1$ and $\gamma \in (0,1)$. The optimal policy for the sensor coordination MDP is thus independent of state, and can therefore be expressed as $$\pi^* = \arg\max_{i=1,2,\ldots,n} r_i p_{i|A}$$

which is a direct function of the conditional probabilities $p_{i|A}$ and the a priori rewards $r_i$ for $i = 1, 2, \ldots, n$.

Although limited embodiments of a system and method for sensor coordination have been specifically described and illustrated herein, many modifications and variations will be apparent to those skilled in the art. Accordingly, it is to be understood that the system and method for sensor coordination employed according to principles of this invention may be embodied other than as specifically described herein. The invention is also defined in the following claims, and equivalents thereof.

What is claimed is:

1. A system for identifying a preferred sensor from among the plurality of sensors for trustworthy sensing of a target, the system comprising:
a plurality of sensors, each detecting a plurality of objects by receiving signals from the plurality of objects, wherein one or more of the received signals are not from to the target; and
a processing circuit, configured to:
identify a preferred sensor from among the plurality of sensors for trustworthy sensing of the target, the identifying comprising:
calculating, for each of the plurality of sensors, the product of:
a reward function for the sensor; and
a Bayesian conditional probability of the sensor correctly identifying the target from among the plurality of objects detected by the sensor, given an association event between the plurality of sensors, wherein the Bayesian conditional probability is a Bayesian probability of the sensor correctly identifying the target from among the plurality of objects,
the association event between the plurality of sensors comprising, for each of the plurality of sensors:
a plurality of objects detected by the sensor, and
an identification, by the sensor, of one of the plurality of objects as the target, wherein the association event includes, for each of the plurality of sensors: a data structure for a plurality of objects detected by the sensor, and a data structure for an identification, by the sensor, of one of the plurality of objects as the target, and wherein the processing circuit transmits data from the preferred sensor to a guidance system for tracking the target.

2. The system of claim 1, wherein the plurality of sensors consists of a first sensor and a second sensor, and the processing circuit is further configured to calculate the conditional probability of the first sensor correctly identifying the target from among a plurality of objects detected by the first sensor, given an association event, according to the proportionality relation $$p(X_1 = 1 | A) \propto p_1(p_2 p_A + (1-p_2)(1-p_A)),$$

wherein:
$p_1$ an estimated prior probability of the first sensor correctly identifying the target from among a plurality of objects detected by the first sensor,
$p_2$ is an estimated prior probability of the second sensor correctly identifying the target from among a plurality of objects detected by the second sensor, and
$p_A$ is an estimated probability of:
the sensors both correctly identifying the target, or
the sensors both incorrectly identifying the target.

3. The system of claim 2, wherein the processing circuit is further configured to calculate the estimated probability of:
the sensors both correctly identifying the target, or
the sensors both incorrectly identifying the target according to the equation $$p((i^*, j^*) \in \theta | \mathcal{D}) = \frac{\sum_{\{\theta : (i^*, j^*) \in \theta\}} L(\theta)}{\sum_{\theta \in \Theta} L(\theta)},$$

wherein:
each θ is an association hypothesis between the plurality of objects detected by the first sensor and the plurality of objects detected by the second sensor,
Θ is a set of all possible association hypotheses, and $L(\theta)=\exp \Sigma_{(i,j)\in\theta} l_{ij}$, wherein $l_{ij}$ is a log likelihood score corresponding to a measure of similarity between the i-th object detected by the first sensor and the j-th object detected by the second sensor.

4. The system of claim 2, wherein the processing circuit is further configured to calculate a log likelihood score $l_{ij}$ according to the equation $$l_{ij}=\log p(z_i,w_j),$$

wherein:

$$p(z_i,w_j)=(1+d_{ij}^2)\exp(-d_{ij}^2),$$

$$d_{ij}^2=(z_i-w_j)^T\Sigma^{-1}(z_i-w_j),$$

$$\Sigma=U_i+V_j,$$

$z_i$ is a vector of features of the i-th object detected by the first sensor,
$w_j$ is a vector of features of the j-th object detected by the second sensor,
$U_i$ is a covariance matrix of the first sensor,
$V_j$ is a covariance matrix of the second sensor,
$p(z_i,w_j)$ is a chi-square distribution, and
$d_{i,j}$ is a Mahalanobis distance.

5. The system of claim 4, wherein the processing circuit is further configured to substitute for the calculated log likelihood score $l_{ij}$ a value of negative infinity when the square root of $d_{ij}^2$ falls below a threshold.

6. The system of claim 4, wherein both the numerator and the denominator of the estimated probability of:
the sensors both correctly identifying the target, or the sensors both incorrectly identifying the target are calculated using a depth-first search.

7. The system of claim 4, wherein both the numerator and the denominator of the estimated probability of:
the sensors both correctly identifying the target, or the sensors both incorrectly identifying the target are calculated using a Murty algorithm.

8. A method for identifying a preferred sensor from among the plurality of sensors for trustworthy sensing of a target with a plurality of sensors, the method comprising:
receiving a plurality of signals from the plurality of sensors, each sensor detecting a plurality of objects, wherein one or more of the received signals are not from to the target;
identifying a preferred sensor from among the plurality of sensors for trustworthy sensing of the target, the identifying comprising:
calculating, for each of the plurality of sensors, the product of:
a reward function for the sensor; and
a Bayesian conditional probability of the sensor correctly identifying the target from among the plurality of objects detected by the sensor, given an association event between the plurality of sensors, wherein the Bayesian conditional probability is a Bayesian probability of the sensor correctly identifying the target from among the plurality of objects,
the association event between the plurality of sensors comprising, for each of the plurality of sensors:
a plurality of objects detected by the sensor,
an identification, by the sensor, of one of the plurality of objects as the target, wherein the association event includes, for each of the plurality of sensors: a data structure for a plurality of objects detected by the sensor, and a data structure for an identification, by the sensor, of one of the plurality of objects as the target, and
transmitting data from the preferred sensor to a guidance system for tracking the target.

9. The method of claim 8, wherein the plurality of sensors consists of a first sensor and a second sensor, and the method further comprises calculating the conditional probability of the first sensor correctly identifying the target from among a plurality of objects detected by the first sensor, given an association event, according to the proportionality relation $$p(X_1=1|A)\propto p_1(p_2 p_A+(1-p_2)(1-p_A)),$$

wherein:
$p_1$ an estimated prior probability of the first sensor correctly identifying the target from among a plurality of objects detected by the first sensor,
$p_2$ is an estimated prior probability of the second sensor correctly identifying the target from among a plurality of objects detected by the second sensor, and
$p_A$ is an estimated probability of:
the sensors both correctly identifying the target, or
the sensors both incorrectly identifying the target.

10. The method of claim 9, further comprising calculating the estimated probability of:
the sensors both correctly identifying the target, or
the sensors both incorrectly identifying the target according to the equation $$p((i^*,j^*)\in\theta|\mathcal{D})=\frac{\sum_{\{\theta:(i^*,j^*)\in\theta\}} L(\theta)}{\sum_{\theta\in\Theta} L(\theta)},$$

wherein:
each θ is an association hypothesis between the plurality of objects detected by the first sensor and the plurality of objects detected by the second sensor,
Θ is the set of all possible association hypotheses, and $L(\theta)=\exp \Sigma_{(i,j)\in\theta} l_{ij}$, wherein $l_{ij}$ is a log likelihood score corresponding to a measure of similarity between the i-th object detected by the first sensor and the j-th object detected by the second sensor.

11. The method of claim 9, further comprising calculating a log likelihood score according to the equation $$l_{ij}=\log p(z_i,w_j),$$

wherein:

$$p(z_i,w_j)=(1+d_{ij}^2)\exp(-d_{ij}^2),$$

$$\Sigma=U_i+V_j,$$

$z_i$ is a vector of features of the i-th object detected by the first sensor,
$w_j$ is a vector of features of the j-th object detected by the second sensor,
$U_i$ is a covariance matrix of the first sensor,
$V_j$ is a covariance matrix of the second sensor,
$p(z_i,w_j)$ is a chi-square distribution, and
$d_{i,j}$ is a Mahalanobis distance.

12. The method of claim 11, further comprising substituting for the calculated log likelihood score $l_{ij}$ a value of negative infinity when the square root of $d_{ij}^2$ falls below a threshold.

13. The method of claim 11, wherein both the numerator and the denominator of the estimated probability of:
the sensors both correctly identifying the target, or the sensors both incorrectly identifying the target are calculated using a depth-first search.

14. The method of claim 11, wherein both the numerator and the denominator of the estimated probability of:
the sensors both correctly identifying the target, or the sensors both incorrectly identifying the target are calculated using a Murty algorithm.

* * * * *